(12) United States Patent  (10) Patent No.: US 8,294,451 B2
Hasenfus  (45) Date of Patent: Oct. 23, 2012

(54) SMART SENSORS FOR SOLAR PANELS

(75) Inventor: Gary D. Hasenfus, Concord, CA (US)

(73) Assignee: Texas Instruments Incorporated, Dallas, TX (US)

( * ) Notice: Subject to any disclaimer, the term of this patent is extended or adjusted under 35 U.S.C. 154(b) by 780 days.

(21) Appl. No.: 12/272,990

(22) Filed: Nov. 18, 2008

(65) Prior Publication Data
US 2009/0140719 A1 Jun. 4, 2009

Related U.S. Application Data

(60) Provisional application No. 61/005,166, filed on Dec. 3, 2007.

(51) Int. Cl.
G01R 31/02 (2006.01)
(52) U.S. Cl. .......................... 324/72; 136/290
(58) Field of Classification Search .................. 136/290; 324/72
See application file for complete search history.

(56) References Cited

U.S. PATENT DOCUMENTS

| | | | |
|---|---|---|---|
| 3,740,636 A | 6/1973 | Hogrefe et al. | |
| 4,129,788 A | 12/1978 | Chavannes | |
| 4,189,765 A * | 2/1980 | Kotalik et al. | 700/83 |
| 4,217,645 A * | 8/1980 | Barry et al. | 324/73.1 |
| 4,280,097 A * | 7/1981 | Carey et al. | 324/434 |
| 4,688,538 A | 8/1987 | Ward et al. | |
| 4,725,740 A | 2/1988 | Nakata | |
| 5,284,719 A * | 2/1994 | Landau et al. | 324/427 |
| 5,307,006 A * | 4/1994 | Rankin et al. | 323/313 |
| 5,317,520 A * | 5/1994 | Castle | 702/58 |
| 5,408,404 A | 4/1995 | Mitchell | |
| 5,412,308 A | 5/1995 | Brown | |
| 5,528,125 A | 6/1996 | Marshall et al. | |
| 5,600,247 A * | 2/1997 | Matthews | 324/426 |
| 5,604,430 A | 2/1997 | Decker et al. | |
| 5,659,465 A * | 8/1997 | Flack et al. | 363/71 |
| 5,666,040 A * | 9/1997 | Bourbeau | 320/118 |
| 5,669,987 A | 9/1997 | Takehara et al. | |
| 5,747,967 A | 5/1998 | Muljadi et al. | |
| 5,751,120 A | 5/1998 | Zeitler et al. | |
| 5,892,354 A | 4/1999 | Nagao et al. | |
| 6,169,678 B1 | 1/2001 | Kondo et al. | |

(Continued)

FOREIGN PATENT DOCUMENTS
EP 1 239 573 A1 9/2002
(Continued)

OTHER PUBLICATIONS

"PV FAQs", U.S. Department on Energy, Jan. 2004, 2 pages.

(Continued)

Primary Examiner — Timothy J Dole
(74) Attorney, Agent, or Firm — Alan A. R. Cooper; Wade James Brady, III; Frederick J. Telecky, Jr.

(57) ABSTRACT

A solar panel smart sensor system is disclosed. The sensor system permits solar power system owners and operators to monitor the voltage of individual panels in a solar array. The system uses a low wire-count bus in which the order of sensors on the bus is automatically determined. A novel technique is used to measure DC voltages of panels that may be floating hundreds of volts above ground. Bypass diodes are monitored to detect lost power generation capacity.

7 Claims, 6 Drawing Sheets

U.S. PATENT DOCUMENTS

| | | | |
|---|---|---|---|
| 6,184,656 B1* | 2/2001 | Karunasiri et al. | 320/119 |
| 6,281,485 B1 | 8/2001 | Siri | |
| 6,331,670 B2 | 12/2001 | Takehara et al. | |
| 6,369,576 B1* | 4/2002 | Matthews et al. | 324/426 |
| 6,608,404 B2 | 8/2003 | Schienbein et al. | |
| 6,633,823 B2 | 10/2003 | Bartone et al. | |
| 6,636,431 B2 | 10/2003 | Seki et al. | |
| 6,717,519 B2* | 4/2004 | Kobayashi et al. | 340/635 |
| 6,750,391 B2 | 6/2004 | Bower et al. | |
| 6,844,739 B2 | 1/2005 | Kasai et al. | |
| 6,850,820 B2 | 2/2005 | Tajima | |
| 6,966,184 B2 | 11/2005 | Toyomura et al. | |
| 6,975,522 B2 | 12/2005 | Asano | |
| 6,984,967 B2 | 1/2006 | Notman | |
| 7,046,527 B2 | 5/2006 | West | |
| 7,477,080 B1* | 1/2009 | Fest | 327/102 |
| 7,566,828 B2 | 7/2009 | Sasaki | |
| 7,605,498 B2 | 10/2009 | Ledenev et al. | |
| 7,701,083 B2 | 4/2010 | Savage | |
| 7,723,865 B2 | 5/2010 | Kitanaka | |
| 7,759,903 B2* | 7/2010 | Kamata | 324/433 |
| 7,843,085 B2 | 11/2010 | Ledenev et al. | |
| 7,925,552 B2 | 4/2011 | Tarbell et al. | |
| 2002/0038667 A1 | 4/2002 | Kondo et al. | |
| 2003/0201674 A1 | 10/2003 | Droppo et al. | |
| 2004/0135545 A1 | 7/2004 | Fowler et al. | |
| 2005/0105224 A1 | 5/2005 | Nishi | |
| 2005/0257827 A1 | 11/2005 | Gaudiana et al. | |
| 2006/0017327 A1 | 1/2006 | Siri et al. | |
| 2006/0149607 A1 | 7/2006 | Sayers et al. | |
| 2006/0162772 A1* | 7/2006 | Presher et al. | 136/290 |
| 2006/0171182 A1 | 8/2006 | Siri et al. | |
| 2006/0176036 A1 | 8/2006 | Flatness et al. | |
| 2007/0024257 A1 | 2/2007 | Boldo | |
| 2007/0137688 A1 | 6/2007 | Yoshida | |
| 2007/0164612 A1 | 7/2007 | Wendt et al. | |
| 2008/0013347 A1 | 1/2008 | Deng et al. | |
| 2008/0087321 A1 | 4/2008 | Schwartzman | |
| 2008/0097655 A1 | 4/2008 | Hadar et al. | |
| 2008/0143188 A1 | 6/2008 | Adest et al. | |
| 2008/0147335 A1* | 6/2008 | Adest et al. | 702/64 |
| 2008/0150366 A1 | 6/2008 | Adest et al. | |
| 2008/0278983 A1 | 11/2008 | Park | |
| 2009/0039852 A1 | 2/2009 | Fishelov et al. | |
| 2009/0242011 A1 | 10/2009 | Prolsy et al. | |
| 2009/0283128 A1 | 11/2009 | Zhang et al. | |
| 2009/0283129 A1 | 11/2009 | Foss | |
| 2009/0284078 A1 | 11/2009 | Zhang et al. | |
| 2009/0284232 A1 | 11/2009 | Zhang et al. | |
| 2009/0284240 A1 | 11/2009 | Zhang et al. | |
| 2009/0284998 A1 | 11/2009 | Zhang et al. | |
| 2009/0289502 A1 | 11/2009 | Batarseh et al. | |
| 2010/0001587 A1 | 1/2010 | Casey et al. | |
| 2010/0126550 A1 | 5/2010 | Foss | |
| 2010/0269883 A1 | 10/2010 | Sarhan | |
| 2010/0288327 A1 | 11/2010 | Lisi et al. | |
| 2010/0327659 A1 | 12/2010 | Lisi et al. | |

FOREIGN PATENT DOCUMENTS

| | | |
|---|---|---|
| ES | 2 249 147 B1 | 5/2007 |
| JP | 07-234733 A | 9/1995 |
| JP | 08-123563 A | 5/1996 |
| JP | 08-314555 A | 11/1996 |
| JP | 10014105 A | 1/1998 |
| JP | 10155240 A | 6/1998 |
| JP | 11098679 A | 4/1999 |
| JP | 2000112545 A | 4/2000 |
| JP | 2000116010 A | 4/2000 |
| JP | 2003134661 A | 5/2003 |
| JP | 2003216255 A | 7/2003 |
| JP | 2005-151662 | 6/2005 |
| JP | 2005243852 A | 9/2005 |
| JP | 2005252172 A | 9/2005 |
| JP | 2006134118 A | 5/2006 |
| JP | 2006216660 A | 8/2006 |
| JP | 2006-320149 | 11/2006 |
| JP | 2007-133765 | 5/2007 |
| KR | 100757320 B1 | 9/2007 |
| KR | 20080010116 A | 1/2008 |
| KR | 100886891 B1 | 3/2009 |
| KR | 1020090133036 A | 12/2009 |
| WO | WO 2007/084196 A2 | 7/2007 |

OTHER PUBLICATIONS

"Perspectives of Concentrating Solar Power", Renewable Energy India 2008 Expo, Aug. 22, 2008, 16 pages.

"APEC 2008, 23rd Annual Applied Power Electronics Conference and Exposition", vol. 1, Seminars 1-6, Feb. 24-28, 2008, Austin, Texas, 89 pages.

Yunwei Li, et al., "Design, Analysis, and Real-Time Testing of a Controller for Multibus Microgrid System", IEEE Transactions on Power Electronics, vol. 19, No. 5, Sep. 2004, p. 1195-1204.

R.H. Lasseter, "MicroGrids", 2002 IEEE Power Engineering Society Winter Meeting, vol. 1, Jan. 2002, p. 305-308.

John Stevens, "Development of Sources and a Testbed for CERTS Microgrid Testing", 2004 IEEE Power Engineering Society General Meeting, Jun. 2004, p. 1-2.

Mike Barnes, et al., "Real-World MicroGrids—An Overview", 2007 IEEE SoSE International Conference, Apr. 2007, p. 1-8.

Paolo Piagi, et al., "Autonomous Control of Microgrids", IEEE Power Engineering Society General Meeting, Jun. 2006, 8 pages.

Y. Zoka, et al., "An interaction Problem of Distributed Generators Installed in a MicroGrid", 2004 IEEE International Conference on Electric Utility Deregulation, Restructuring and Power Technologies (DRPT2004), Apr. 2004, Hong Kong, p. 795-799.

M.P.F. Hommelberg, et al., "Distributed Control Concepts using Multi-Agent technology and Automatic Markets: An indispensable feature of smart power grids", 2007 IEEE Power Engineering Society General Meeting, Jun. 2007, p. 1-7.

Notification of Transmittal of the International Search Report and the Written Opinion of the International Searching Authority, or the Declaration dated Dec. 17, 2009 in connection with PCT Application No. PCT/US2009/044033.

Guo Heng, et al., "A Novel Maximum Power Point Tracking Strategy for Stand-alone Solar Pumping Systems", 2005 IEEE, 5 pages.

Debosmita Das, et al., "An Optimal Design of a Grid Connected Hybrid Wind/Photovoltaic/Fuel Cell System for Distributed Energy Production", 2005 IEEE, p. 2499-2504.

Claus Bjerge, et al., "How to run an offshore wind farm like a conventional power plant", www.modernpowersystems.com, Jan. 2007, 4 pages.

Steven Anderson, "Remote . . . But Not Economically Out of Reach", Power and Energy, Dec. 15, 1986, 5 pages.

Qihi Liu, et al., "Novel Modeling and Control of Doubly-Fed Variable-Speed Constant-Frequency Wind Power Generator", The 33rd Annual Conference of the IEEE Industrial Etectronics Society (IECON), Nov. 5-8, 2007, p. 1621-1626.

Casisheng Wang, "Modeling and Control of Hybrid Wind/Photovoltaic/Fuel Cell Distributed Generation Systems", Jul. 2006, Montana State University, 403 pages.

Notification of Transmittal of the International Search Report and the Written Opinion of the International Searching Authority, or the Declaration dated Dec. 23, 2009 in connection with International Patent Application No. PCT/US2009/044036.

Jianhui Zhang, et al., "Active Cell and Module Balancing for Batteries or Other Power Supplies", U.S. Appl. No. 12/882,781, filed Sep. 15, 2010.

Ramesh Khanna, "Solar-Powered Battery Charger and Related System and Method", U.S. Appl. No. 12/589,984, filed Oct. 30, 2009.

Andrew Foss, "System and Method for Solar Panel Array Analysis", U.S. Appl. No. 12/386,958, filed Apr. 24, 2009.

Gianpaolo Lisi, et al., "Off-Grid LED Street Lighting System With Multiple Panel-Storage Matching", U.S. Appl. No. 12/925,110, filed Oct. 14, 2010.

Notification of Transmittal of the International Search Report and the Written Opinion of the International Searching Authority, or the Declaration dated Dec. 24, 2009 in connection with International Patent Application No. PCT/US2009/044019.

Carlos Meza, et al., "Boost-Buck inverter variable structure control for grid-connected photovoltaic systems", 2005 IEEE, p. 1318-1321.

Mikihiko Matsui, et al., "A New Maximum Photovoltaic Power Tracking Control Scheme Based on Power Equilibrium at DC Link", 1999 IEEE, p. 804-809.

Notification of Transmittal of the International Search Report and the Written Opinion of the International Searching Authority, or the Declaration dated Dec. 23, 2009 in connection with PCT Application No. PCT/US2009/044027.

Notification of Transmittal of the International Search Report and the Written Opinion of the International Searching Authority, or the Declaration dated Dec. 23, 2009 in connection with PCT Application No. PCT/US2009/044015.

Jianhui Zhang, et al., "Method and System for Providing Central Control in a Energy Generating System", U.S. Appl. No. 12/152,479, filed May 14, 2008.

Stephen W. Moore, et al., "A Review of Cell Equalization Methods for Lithium Ion and Lithium Polymer Battery Systems", Society of Automotive Engineers, Inc., 2001, 5 pages.

Sihua Wen, "Cell balancing buys extra run time and battery life", Analog Applications Journal, 2009, 8 pages.

"Five to Ten Series Cell Lithium-Ion or Lithium-Polymer Battery Protector and Analog Front End", Texas Instruments, Jun. 2008, 60 pages.

"Li-Ion, NiMH Battery Measuring, Charge Balancing and Power-supply Circuit", Atmel Corporation, Oct. 2009, 55 pages.

Werner Rößler, "Boost battery performance with active charge-balancing", EE Times-Asia, Jul. 16-31, 2008, p. 1-3.

Notification of Transmittal of the International Search Report and the Written Opinion of the International Searching Authority, or the Declaration dated Dec. 31, 2010 in connection with PCT Application No. PCT/US2010/031462.

Notification of Transmittal of the International Search Report and the Written Opinion of the tnternational Searching Authority, or the Declaration dated Jan. 3, 2011 in connection with PCT Application No. PCT/US2010/031505.

Notification of Transmittal of the International Search Report and the Written Opinion of the International Searching Authority, or the Dectaration dated Jan. 13, 2011 in connection with PCT Application No. PCT/US2010/034783.

Office Action dated Sep. 21, 2011 in connection with U.S. Appl. No. 12/456,777.

Office Action dated Aug. 30, 2011 in connection with U.S. Appl. No. 12/386,958.

"Micropower Synchronous, Buck-Boost DC/DC Converter", MiniLogic Device Corporation, Sep. 2005, p. 1-13.

Geoffrey R. Walker, et al., "Cascaded DC-DC Converter Connection of Photovoltaic Modules", IEEE Transactions on Power Electronics, vol. 19, No. 4, Jul. 2004, p. 1130-1139.

Office Action dated Dec. 9, 2011 in connection with U.S. Appl. No. 12/454,244.

Office Action dated Jan. 25, 2012 in connection with U.S. Appl. No. 12/454,136.

Office Action dated Dec. 30, 2011 in connection with U.S. Appl. No. 12/456,776.

* cited by examiner

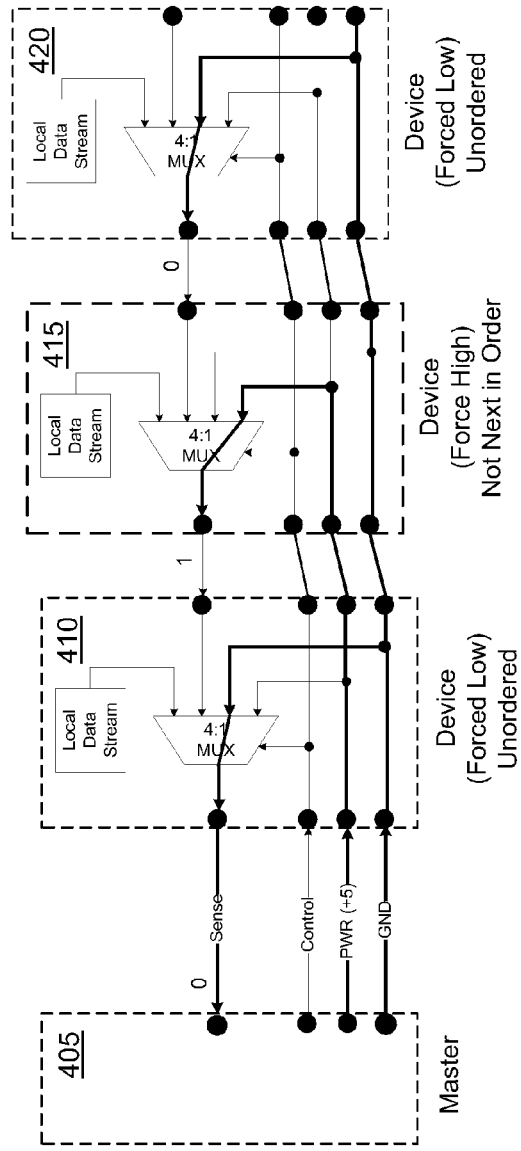
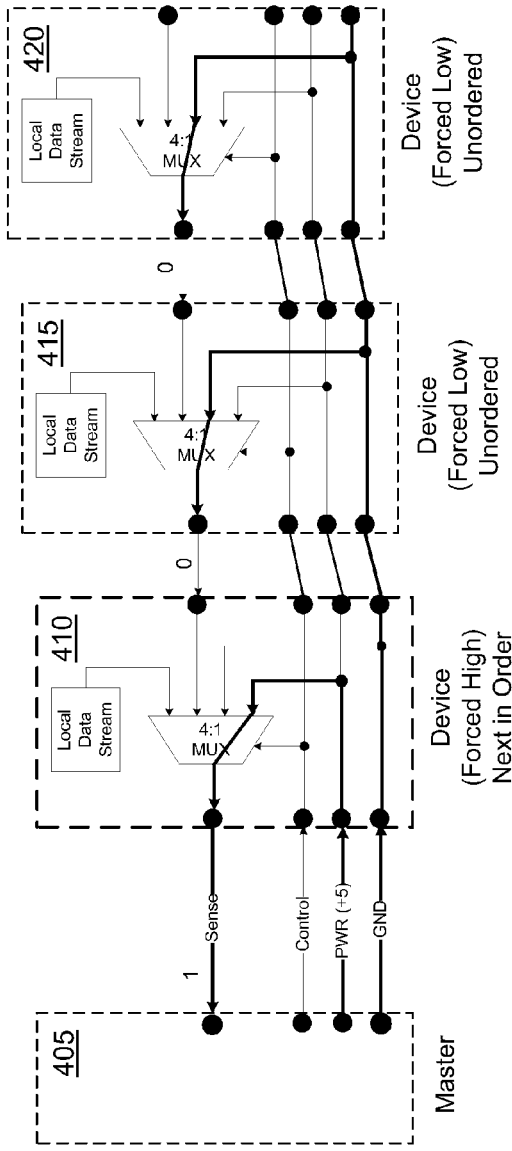
Fig. 4B
Fig. 4C

SMART SENSORS FOR SOLAR PANELS

RELATED APPLICATIONS

This application claims priority benefit from U.S. provisional patent application No. 61/005,166, filed on Dec. 3, 2007, which is incorporated herein by reference.

TECHNICAL FIELD

The disclosure is related to apparatus and methods for solar panel performance monitoring.

BACKGROUND

Solar power was once the choice only of idealists who put the environment before economics; however, production of solar panels is ramping up rapidly and is expected to double in both 2008 and 2009, with growth driven by government support especially in Germany and Japan.

Governments are turning to the sun as a weapon both against climate change and energy dependence. Subsidies are needed because solar is still more expensive than conventional power sources like coal, but costs are dropping by around 5 percent a year and "grid parity," without subsidies, is already a reality in parts of California.

Grid parity could be achieved sooner by smart management of conventional solar systems. In a conventional solar array, all of the individual panels in the array must receive full sunlight for the array to work properly. If a portion of the array is shaded or otherwise impaired, the entire array power output—even from those sections still exposed to sunlight—is lowered. Inevitably, efficiency-killing variations among panels exist in the vast majority of solar arrays. When these variations go undetected and uncorrected the result is that a significant amount of energy, and money, is "left on the roof."

High-resolution monitoring devices and diagnostic tools are needed to extract better performance from solar arrays. A solar array may comprise tens, hundreds or even thousands of individual panels. If data could be collected from each of those panels it could be used to optimize the power output of the entire array over its lifetime. The ability to maintain an array at maximum power efficiency significantly increases its energy generation potential.

What is needed is a way to identify panels with differing voltage characteristics during array operation. Knowledge of the voltage output of individual panels would be valuable to owners and operators of solar arrays because it would allow them to identify which panels were dragging down the efficiency of their solar power systems.

In this application, solar "cells" are monolithic semiconductor devices that generate electric current when light shines on them. Cells are connected to other cells through both series and parallel electrical connections. A "string of cells" is a set of cells connected electrically in series. A "panel" comprises strings of cells connected electrically in parallel. A "string of panels" is a set of panels connected electrically in series. An "array" comprises strings of panels connected electrically in parallel. Finally a collection of arrays forms a "site".

Conventional solar panel junction boxes lack the capability to monitor system performance at the panel level. In conventional systems only the overall performance of an array, or even a site, is measured.

BRIEF DESCRIPTION OF THE DRAWINGS

The drawings are heuristic for clarity.

FIGS. 4A-4D show a string of devices on a low-wire-count bus and illustrate a method for determining the order of the devices on the bus.

DETAILED DESCRIPTION

Solar panels convert sunlight directly into DC electric power. A component called an inverter converts this DC power into AC power. Normally, a solar panel site is interconnected with the AC power grid from a utility company. During the day, if the solar system produces more electricity than a house or building is using, the utility company may allow a credit for any excess power returned to the grid.

So far solar power is not economically competitive with conventional power sources such as oil, coal or nuclear power plants. The situation is rapidly changing however as the price of solar power systems declines and the price of fossil fuel increases. The systems and methods described here accelerate the benefit of solar power by making conventional solar power systems more efficient. Increased power can be generated from an existing solar power system at very low additional cost.

Operating a solar power site efficiently depends on understanding what is happening within the system at the level of individual solar panels. Lacking information on a panel-by-panel basis, it is hard to know whether or not a system is operating at peak efficiency, and if it is not, why not.

The smart sensors described here permit quick diagnosis of inefficiencies and lost generation capacity by sensing voltages generated by individual solar panels and by monitoring panel bypass diodes. Furthermore the sensors communicate via a simple, low-wire-count bus. A method for finding the physical position of each sensor on the bus is described.

Smart sensors measure the voltage of individual solar panels in an array. The devices and methods described here are also applicable to measurements of other voltage sources connected in series such as the measurement of the voltages of individual batteries in an uninterruptible power supply or hybrid vehicle.

One of the challenges of measuring the voltages of solar panels in an array is that each panel has an independent ground potential that may vary by hundreds of volts from panel to panel and by 1000 volts or more compared to earth ground. The measurement sensors described here are therefore isolated so that they do not require a common ground with a panel being measured.

Figure 1:
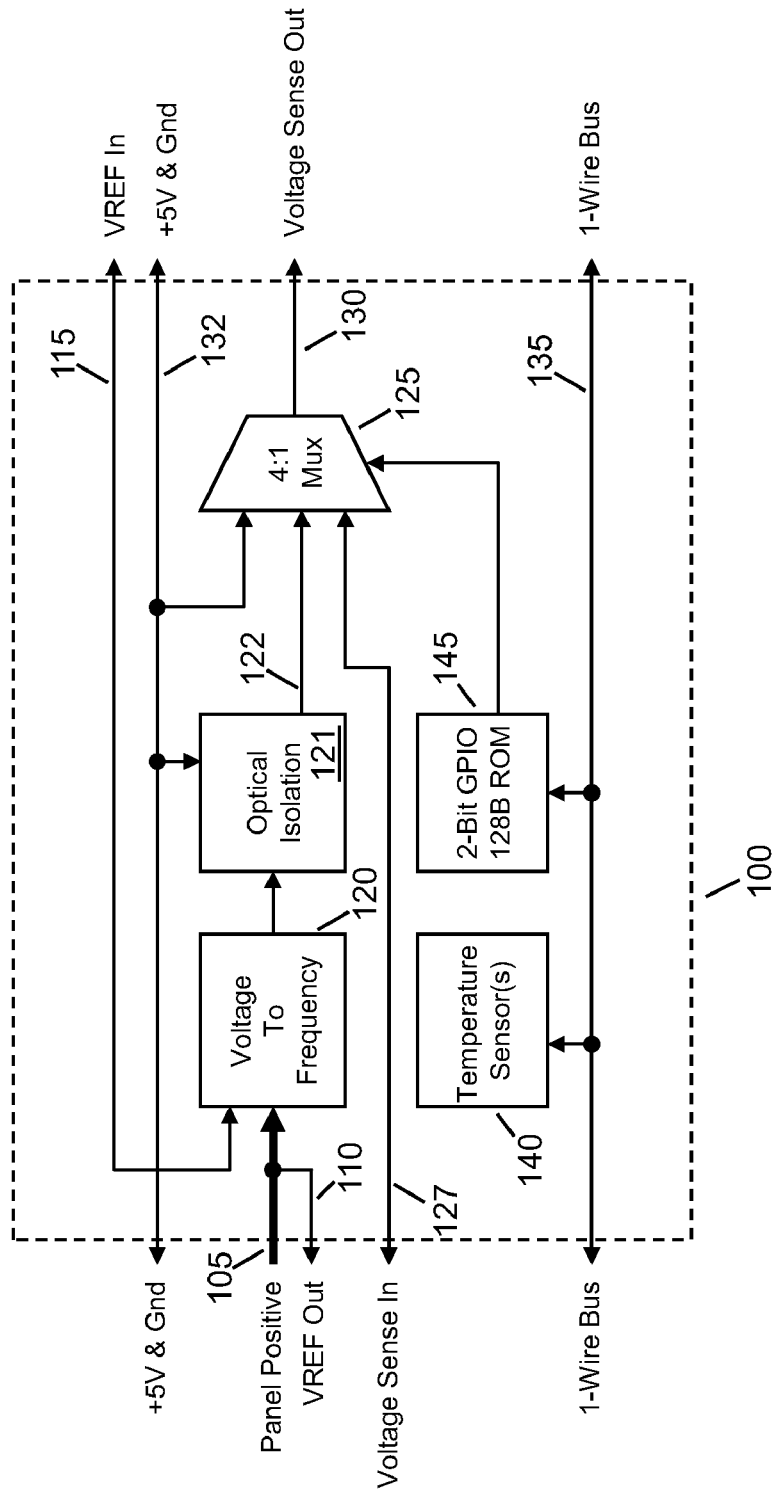
FIG. 1 shows a voltage measuring device.
Figure 2:
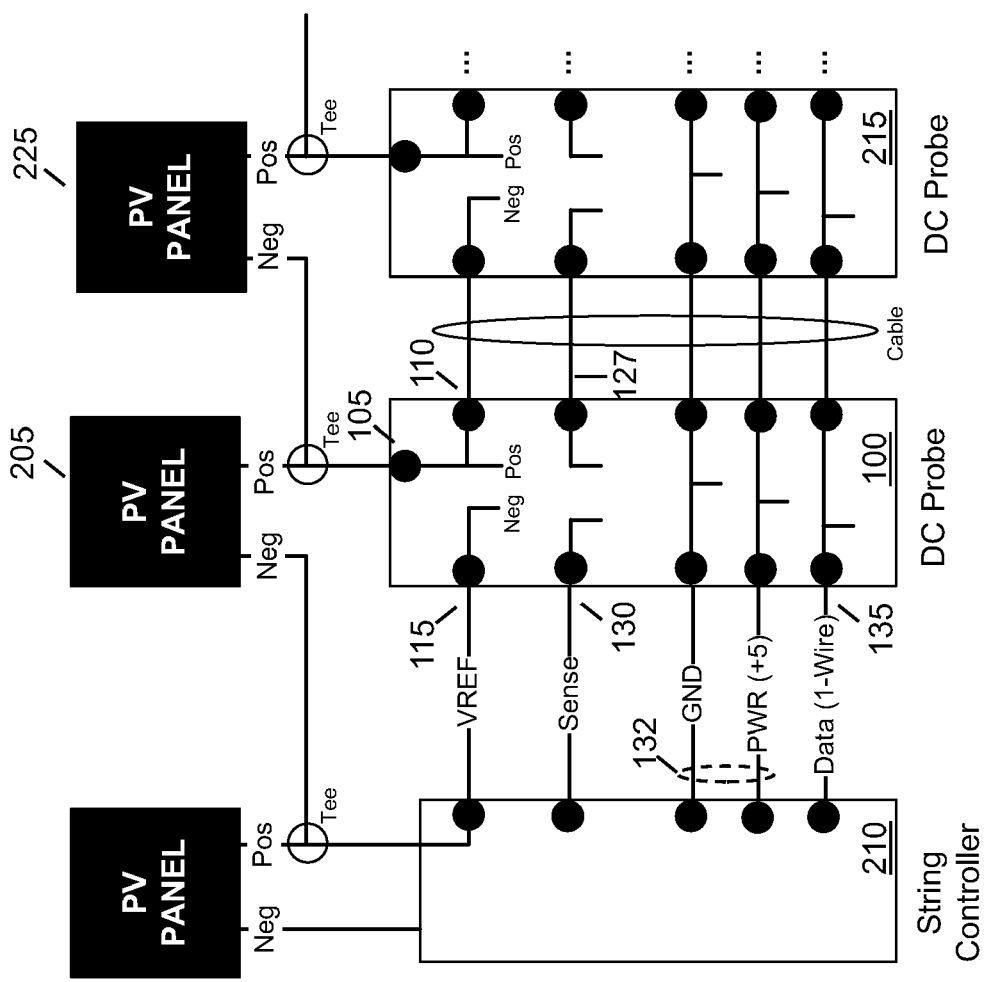
FIG. 2 shows how voltage measuring devices of the type illustrated in FIG. 1 may be arranged on a bus to monitor solar panels.

FIG. 1 shows a diagram of the voltage measuring and communication blocks of a smart sensor 100 which can be implemented as part of a standard solar panel junction box. FIG. 2 shows a string of such sensors connected to a string of solar panels. Each sensor is connected to its neighbor by five wires. These are: ground and control power 132 (two wires), data 135 (one wire), sense-in 127 (or sense-out 130) (one wire), and VREF-in 115 (or VREF-out 110) (one wire).

Each sensor is further connected via "Panel Positive" 105 to the positive terminal of the solar panel (e.g. 205) whose voltage output is being measured. Since the solar panels are connected in series, the negative terminal of each one is connected to the positive terminal of its neighbor. The negative voltage reference is transferred from one sensor to another via the VREF wire.

In FIG. 1, "Panel Positive" 105 is connected to the local panel positive tap; i.e. the positive terminal of the panel being measured. "VREF In" 115 is connected to the positive terminal of the neighboring panel which is connected to the negative terminal of the panel being measured. Only one direct connection between the sensor and the panel is needed because the panels are connected in series.

"Panel Positive" and "VREF In" are connected to a voltage-to-frequency converter circuit 120 whose pulse output 122 is optically isolated in block 121 from its inputs. A possible implementation of voltage-to-frequency converter 120 and optical isolation block 121 is shown in FIG. 3 as circuit 300.

Figure 3:
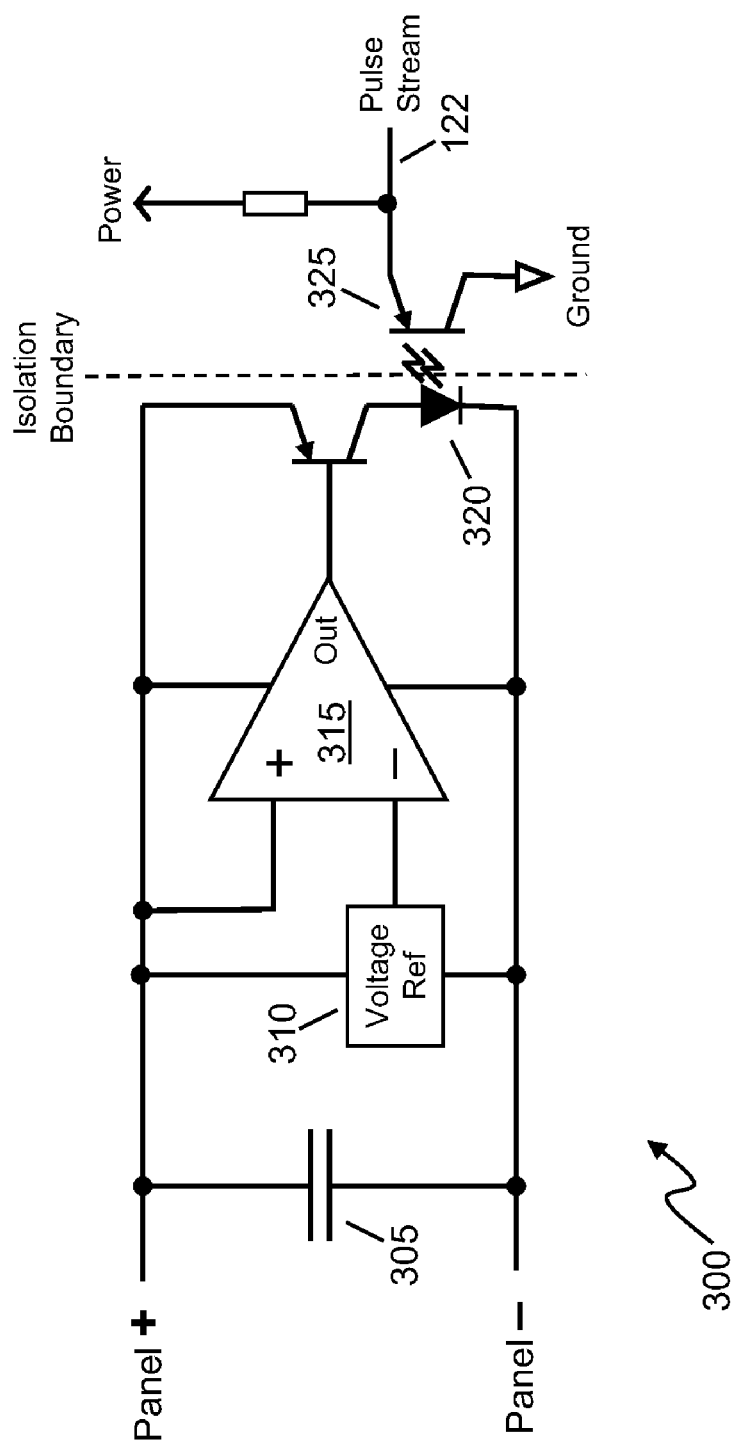
FIG. 3 shows a voltage-to-frequency converter with an optically isolated output.

In FIG. 3 the voltage difference between "Panel +" and "Panel –" charges precision capacitor 305. A comparator 315 senses when the capacitor is charged to the level set by voltage reference 310. (Comparator 315 and voltage reference 310 may be contained in one package.) At that point, the capacitor is discharged through light emitting diode (LED) 320. Photodiode 325 placed near the LED creates an electrical pulse whenever the LED turns on. The greater the voltage between "Panel +" and "Panel –", the more often an electrical pulse is generated; i.e. the repetition rate of electrical pulses 122 is proportional to the measured voltage. The LED-photodiode combination provides optical isolation between the input and output of the circuit.

Pulse output 122, or in general a local data stream, is one of the inputs to control multiplexer 125 in FIG. 1. Multiplexer 125 is also connected to control power and ground 132, sense in 127 and sense out 130 signal lines, and 2-bit general purpose input/output (GPIO) device and 128-bit read only memory (ROM) 145. The 2-bit GPIO interfaces the multiplexer to bus 135. The GPIO selects which of the four inputs to multiplexer 125 is connected to sense out signal line 130. The 128-bit ROM is used to store voltage calibration information and temperature sensor address(es) if temperature sensors are included in smart sensor 100. Optional digital temperature sensor(s) 140 provide their output directly to bus 135.

FIG. 2 shows how voltage measuring devices of the type illustrated in FIG. 1 may be arranged on a bus to monitor solar panels. Sensors 100 and 215 measure the voltage of photovoltaic ("PV"; i.e. solar) panels 205 and 225 respectively. String controller 210 is connected to sensor 100 via ground, power, data, sense and VREF lines; however controller 210 contains additional logic compared to sensors 100 and 215.

Smart sensors may also include monitoring of bypass diodes associated with each solar panel. Bypass diodes are connected in parallel with, but with opposite polarity to, solar panels. Under normal operation, each panel is forward biased and therefore its bypass diode is reverse biased and is effectively be an open circuit. However, if a panel is reverse biased due to a mismatch in short-circuit current between several series connected cells, then the bypass diode conducts, thereby allowing the current from good solar cells to flow in the external circuit rather than forward biasing each good cell. The maximum reverse bias across a poor cell is reduced to about a single diode drop, thus limiting the current and preventing hot-spot heating.

Bypass diodes employed in conventional solar panels are unmonitored and therefore information about the heath of a panel is lost. Smart sensors described herein, however, can monitor bypass diodes by measuring their temperature with digital temperature sensors. The temperature of the diodes rises rapidly if they begin conducting. The smart sensor can be fit into a standard solar panel junction box such that the digital temperature sensors lie in close proximity to the bypass diodes; i.e. close enough for the temperature sensors to respond to changes in the diodes' temperatures. However, the temperature sensors need not touch the diodes directly; they remain galvanically isolated from the diodes.

The temperature rise of a bypass diode depends upon whether or not the diode is in bypass operation or leaking and can indicate whether or not a loss of power generation exists for cells within the panel serviced by the diode. A loss of power generation in one panel can affect the overall operation of an array by creating an imbalance in the maximum power point between strings of panels or skewing the maximum power point tracking mechanism.

FIGS. 4A-4D show a string of devices on a low-wire-count bus and illustrate a method for determining the physical order of the devices on the bus. The system and method illustrated in FIG. 4 is applicable not only to a string of voltage measuring sensors in a solar power system, but also to any situation in which it is useful to determine the physical order of devices linked by a low-wire-count bus. Low-wire-count serial buses often employ mechanisms to discover the individual addresses of devices on the bus but because the signaling line is shared they are not able to determine the physical ordering of those devices.

Figure 4A:
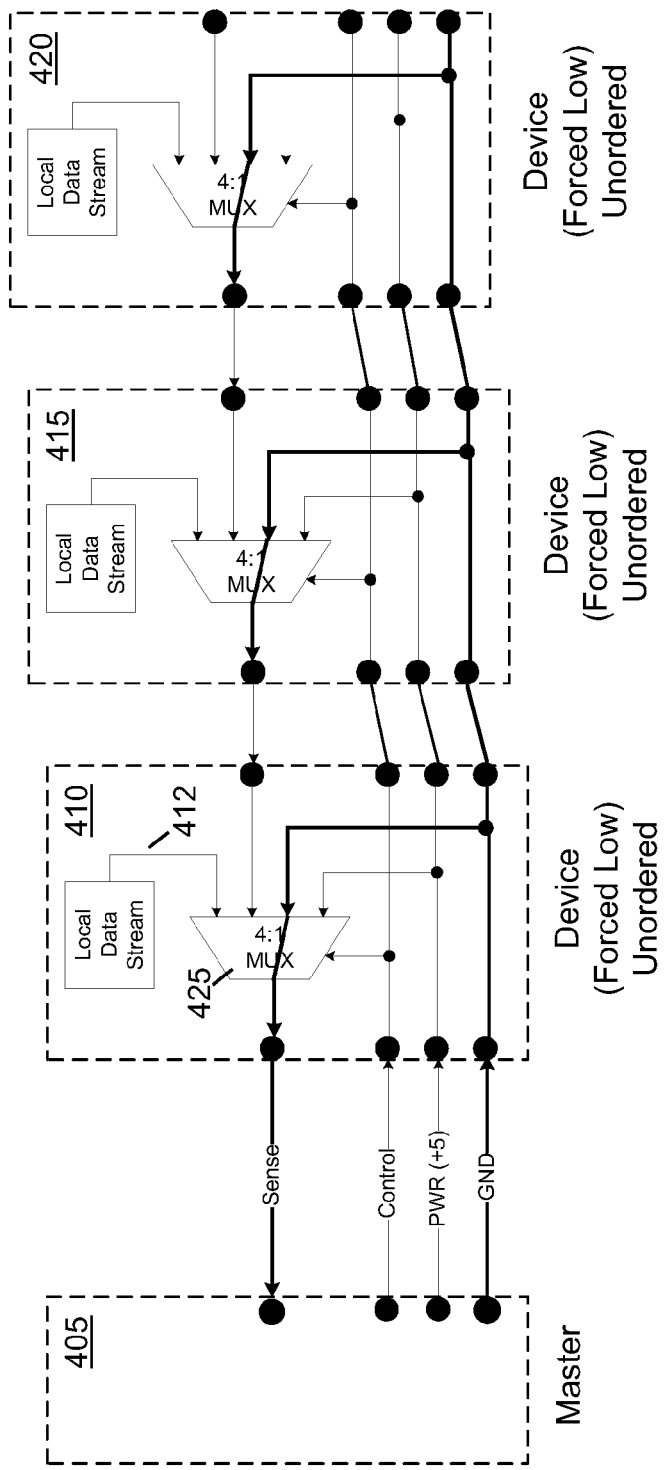

FIG. 4A shows three devices 410, 415, 420 connected to each other and to a master controller 405 by a low-wire-count bus. In addition to power and ground wires, the bus includes a control line. In response to signals received on the control line, a multiplexer (mux) 425 in each device connects the sense output of the device to one of: the local data stream 412, the sense input of the device, power (logical 1), or ground (logical 0). Local data stream 412 corresponds to the output 122 of the voltage to frequency converter 120 in FIG. 1. In FIG. 4A, all three devices shown have their sense outputs connected by their muxes to ground. At this point the master controller has not yet learned the physical order of devices on the bus.

All devices are initially set to output a logical 0. Devices are then toggled to logical 1 one by one until the bus master detects a high. Because the signal line is connected serially and gated by each device, only the device geographically closest to the bus master can drive its input high. This device is then set to pass the signal of its upstream neighbor and the process is repeated on the remaining devices to determine the next closest device, until the order of all devices has been identified.

Step-by-step the method is as follows:

1. Set all unordered devices to "Forced Low"; see FIG. 4A. The output sense lines are now isolated from each other and the signal is not transferred between devices.

2. One-by-one set each unordered device's output to "Forced High" until an edge (low to high transition) is detected by the master controller's input capture logic. See FIG. 4B.

3. The last device set to the "Forced High" mode is the (next) closest device to the string controller. Its signal is detected because it is either directly connected the string controller or all downstream devices have already been ordered and set to "Pass" mode. See FIG. 4C.

4. Set the newly ordered device to "Pass" mode, to exclude it from the search and repeat steps 1-4 to find the next device. See FIG. 4D.

5. Repeat until all devices are ordered.

Figure 4D:
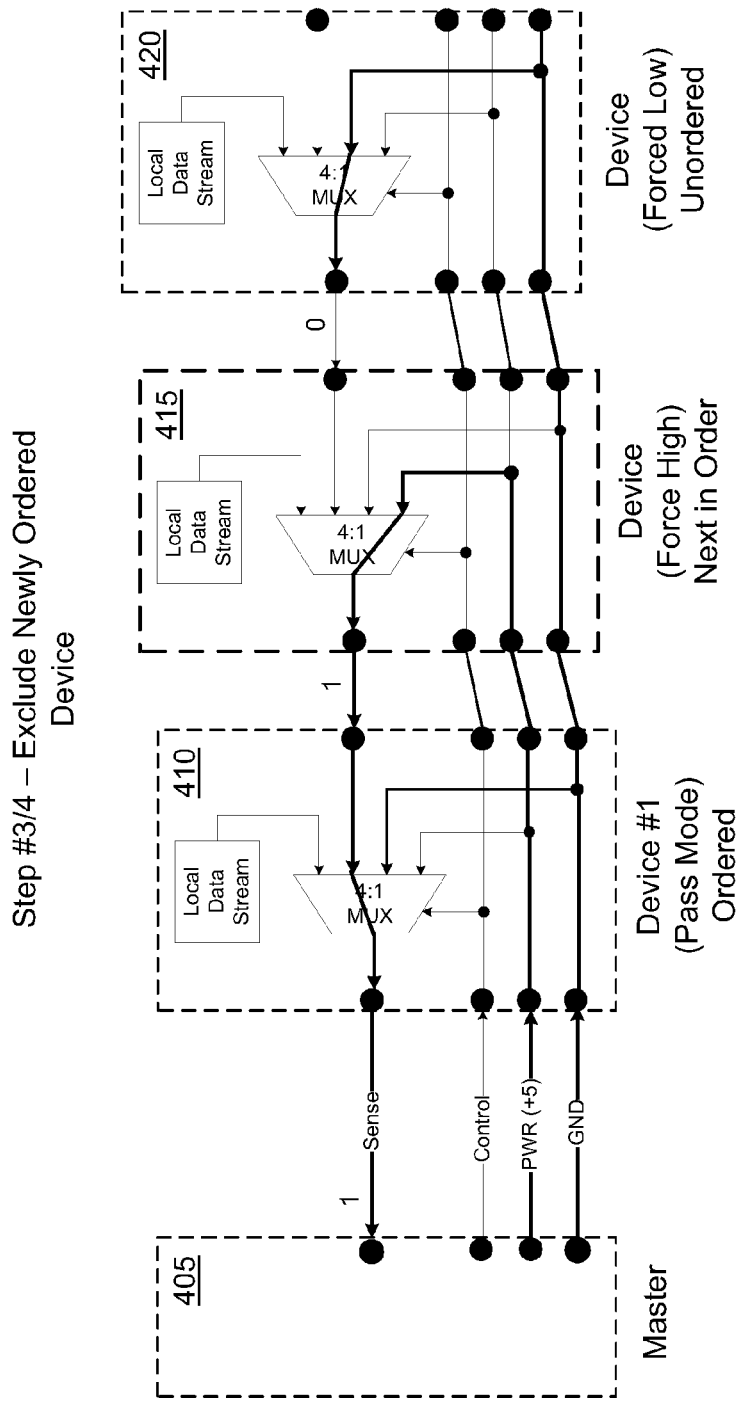

In FIG. 4B, the middle device in the string of three has been set to "Forced High". However, the master sees no change on its sense input because the device closest to it is still in the "Forced Low" mode. In FIG. 4C, the middle device has been returned to "Forced Low" while the device on the left, the closest one to the master, has been set to "Forced High". This time the master senses logical 1 on its sense input; therefore the device set to "Forced High" must be the closest one to the master. Since its position is now known, it can be set to "Pass Mode"; i.e. its sense output can be connected directly to its sense input as shown in FIG. 4D.

The process is then repeated until the order of each device on the bus is known. This quick and simple method for ordering devices on a bus is useful in solar power applications when the physical order of panel voltage sensors is needed.

The smart sensors described herein are useful for measuring the voltages of series-connected voltage sources such as solar panels in a string or individual batteries in a series-connected string of batteries. The sensors float with respect to earth ground so that the voltage measured by each sensor does not become too great, even in a long string. A simple method for determining the order of sensors on a low-wire-count bus has been provided.

As one skilled in the art will readily appreciate from the disclosure of the embodiments herein, processes, machines, manufacture, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, means, methods, or steps.

The above description of illustrated embodiments of the systems and methods is not intended to be exhaustive or to limit the systems and methods to the precise form disclosed. While specific embodiments of, and examples for, the systems and methods are described herein for illustrative purposes, various equivalent modifications are possible within the scope of the systems and methods, as those skilled in the relevant art will recognize. The teachings of the systems and methods provided herein can be applied to other systems and methods, not only for the systems and methods described above.

In general, in the following claims, the terms used should not be construed to limit the systems and methods to the specific embodiments disclosed in the specification and the claims, but should be construed to include all systems that operate under the claims. Accordingly, the systems and methods are not limited by the disclosure, but instead the scope of the systems and methods are to be determined entirely by the claims.

What is claimed is:

1. A solar power generating system comprising:
   multiple photovoltaic panels, each panel connected to its own voltage sensor that is configured to transmit voltage information to a controller via a bus;
   wherein each voltage sensor comprises:
      a voltage-to-frequency converter configured to generate a pulse data signal based on an output voltage of an associated photovoltaic panel; and
      a multiplexer connected to the bus and configured to receive the pulse data signal, the multiplexer comprising: a sense-in terminal configured to receive a sense-out signal associated with another solar panel, a sense-out terminal, a ground terminal, a power terminal, and a control terminal;
      wherein the multiplexer is configured to connect the sense-out terminal to the pulse data signal in response to a first signal received at the control terminal, to the sense-in terminal in response to a second signal received at the control terminal, to the ground terminal in response to a third signal received at the control terminal, and to the power terminal in response to a fourth signal received at the control terminal, wherein
   the bus comprises ground, power, and control wires;
   the ground wire is connected to the ground terminal of the multiplexer in each voltage sensor;
   the power wire is connected to the power terminal of the multiplexer in each voltage sensor;
   the control wire is connected to the control terminal of the multiplexer in each voltage sensor;
   the sense-out terminal of the multiplexer in each voltage sensor, except a last voltage sensor in a string, is connected to the sense-in terminal of the multiplexer in a succeeding voltage sensor in the string; and
   the sense-out terminal of the multiplexer in the last voltage sensor in the string is connected to a bus master.

2. The solar power generating system of claim 1, wherein each voltage sensor is electrically isolated from earth ground.

3. The solar power generating system of claim 1, wherein each voltage sensor further comprises a digital temperature sensor.

4. The solar power generating system of claim 3, wherein the digital temperature sensor of each voltage sensor is configured to respond to changes in a temperature of a bypass diode for its associated solar panel.

5. The solar power generating system of claim 1, wherein the voltage-to-frequency converter in at least one of the voltage sensors has voltage inputs that are optically isolated from a pulse data output.

6. The solar power generating system of claim 1, wherein the voltage-to-frequency converter in at least one of the voltage sensors comprises:
   a precision capacitor;
   a comparator configured to sense when the capacitor is charged to a specified level;
   a light-emitting diode (LED) through which the capacitor is discharged when the capacitor is charged to the specified level; and
   a photodiode configured to create an electrical pulse when the LED turns on.

7. The solar power generating system of claim 1, wherein each voltage sensor further comprises:
   an input/output device configured to interface the multiplexer of that voltage sensor to the bus.

* * * * *